US010936810B2

(12) United States Patent
Sobran et al.

(10) Patent No.: US 10,936,810 B2
(45) Date of Patent: Mar. 2, 2021

(54) TOKEN EMBEDDING BASED ON TARGET-CONTEXT PAIRS

(71) Applicant: INTERNATIONAL BUSINESS MACHINES CORPORATION, Armonk, NY (US)

(72) Inventors: Alexander Sobran, Chapel Hill, NC (US); Bo Zhang, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 16/209,366

(22) Filed: Dec. 4, 2018

(65) Prior Publication Data
US 2020/0175102 A1 Jun. 4, 2020

(51) Int. Cl.
*G06F 40/211* (2020.01)
*G06F 8/41* (2018.01)
(Continued)

(52) U.S. Cl.
CPC .............. *G06F 40/211* (2020.01); *G06F 8/42* (2013.01); *G06F 16/9027* (2019.01);
(Continued)

(58) Field of Classification Search
CPC .............................. G06F 40/21; G06F 16/9027
(Continued)

(56) References Cited

U.S. PATENT DOCUMENTS 6,988,063 B2 * 1/2006 Tokuda ................. G06F 40/253
704/9
7,085,708 B2 * 8/2006 Manson ................. G06F 40/40
704/9
(Continued)

FOREIGN PATENT DOCUMENTS

EP         3304340 A1    4/2018
WO    2016195912 A1    12/2016

OTHER PUBLICATIONS

Bertero, Christophe, et al. "Experience report: Log mining using natural language processing and application to anomaly detection." 2017 IEEE 28th International Symposium on Software Reliability Engineering (ISSRE). IEEE, 2017.pp. 351-360 (Year: 2017).*
(Continued)

*Primary Examiner* — Satish Rampuria
(74) *Attorney, Agent, or Firm* — William Hartwell; Matthew M. Hulihan; Heslin Rothenberg Farley & Mesiti PC

(57) ABSTRACT

Token embedding based on target-context pairs includes obtaining a structural representation of data, the structural representation including nodes and indicating relationships between the nodes, obtaining a context template that identifies relationship(s) to use in identifying a respective context for different nodes of the structural representation, applying the context template to the structural representation to obtain a set of target-context pairs, each of which includes a respective target node of the structural representation and a respective set of context node(s), of the structural repre-
(Continued)

sentation, for that target node, as identified based on the context template, and using the target-context pairs in a model and obtaining, as output of the model, representations of target nodes of the target-context pairs as vectors in a vector space.

20 Claims, 7 Drawing Sheets

(51) Int. Cl.
    *G06N 3/08*     (2006.01)
    *G06F 16/901*     (2019.01)
    *G06F 40/30*     (2020.01)
    *G06F 40/284*     (2020.01)

(52) U.S. Cl.
    CPC ............ *G06F 40/284* (2020.01); *G06F 40/30* (2020.01); *G06N 3/08* (2013.01)

(58) Field of Classification Search
    USPC .................................................. 717/136–167
    See application file for complete search history.

(56) References Cited

U.S. PATENT DOCUMENTS

| | | | |
|---|---|---|---|
| 9,922,025 B2 | 3/2018 | Cross, III et al. | |
| 2005/0273772 A1* | 12/2005 | Matsakis ................... | G06F 8/41 717/136 |
| 2006/0087986 A1 | 4/2006 | Dube et al. | |
| 2007/0162236 A1 | 7/2007 | Lamblin et al. | |
| 2014/0380268 A1* | 12/2014 | Gabel ................... | G06F 40/284 717/104 |
| 2017/0337183 A1* | 11/2017 | Cross, III ................ | G06F 40/30 |

OTHER PUBLICATIONS

Chen, Zimin, and Martin Monperrus. "A literature study of embeddings on source code." arXiv preprint arXiv:1904.03061 (2019).pp. 1-8. (Year: 2019).*

Levy, Omer, and Yoav Goldberg. "Neural word embedding as implicit matrix factorization." Advances in neural information processing systems. 2014.pp. 2177-2185 (Year: 2014).*

Liu, Qianchu, et al. "Investigating cross-lingual alignment methods for contextualized embeddings with token-level evaluation." Proceedings of the 23rd Conference on Computational Natural Language Learning (CoNLL). 2019.pp. 33-43 (Year: 2019).*

Vulić, Ivan, and Marie-Francine Moens. "Monolingual and cross-lingual information retrieval models based on (bilingual) word embeddings." Proceedings of the 38th international ACM SIGIR conference on research and development in information retrieval. 2015.pp. 363-372 (Year: 2015).*

Phan, Minh C., et al. "NeuPL: Attention-based semantic matching and pair-linking for entity disambiguation." Proceedings of the 2017 ACM on Conference on Information and Knowledge Management. 2017.pp. 1667-1666 (Year: 2017).*

Liu, R., et al., "Structural Embedding of Syntactic Trees for Machine Comprehension", Aug. 31, 2017, 10 pgs.

Goyal, P., et al., "Graph Embedding Techniques, Applications, and Performance: A Survey", Dec. 22, 2017, 19 pgs.

Linial, N., et al., "Low Distortion Euclidean Embeddings of Trees", Israel Journal of Mathematics 106. Retrieved on Nov. 15, 2018 from the Internet URL: <http://www.cs.huji.ac.il/~nati/PAPERS/magen_saks_trees>, 1998, pp. 339-348.

Gibert, J., et al., "Graph Embedding in Vector Spaces", GbR'2011 Mini-tutorial. Retrieved on Nov. 15, 2018 from the Internet URL: <https://iapr-c15.greyc.fr/download/03MT.pdf>, May 18, 2011, 66 pgs.

"Semantic trees for training word embeddings with hierarchical softmax", The Lateral Blog. Retrieved on Nov. 15, 2018 from the Internet URL: <https://blog.lateral.io/2017/09/semantic-trees-hierarchical-softmax/>, 11 pgs.

Nickel, M., et al., "Poincaré Embeddings for Learning Hierarchical Representations". Retrieved on Nov. 15, 2018 from the Internet URL: <https://arxiv.org/pdf/1705.08039.pdf>, May 26, 2017, 10 pgs.

Ling, W., et al., "Two/Too Simple Adaptations of Word2Vec for Syntax Problems". Retrieved on Nov. 15, 2018 from the Internet URL: <http://www.cs.cmu.edu/~lingwang/papers/naacl2015>, 6 pgs.

Mikolov, T., et al., "Distributed Representations of Words and Phrases and their Compositionality". Retrieved on Nov. 15, 2018 from the Internet URL: <https://arxiv.org/pdf/1310.4546.pdf>, Oct. 16, 2013, 9 pgs.

Mou, L., et al., "Convolutional Neural Networks over Tree Structures for Programming Language Processing". Retrieved on Nov. 15, 2018 from the Internet URL: <https://arxiv.org/pdf/1409.5718>, Dec. 8, 2015, 8 pgs.

Mou, L., et al., "Building Program Vector Representations for Deep Learning". Retrieved on Nov. 15, 2018 from the Internet URL: <https://arxiv.org/pdf/1409.3358.pdf>, Sep. 11, 2014, 11 pgs.

Mell, Peter, et al., "The NIST Definition of Cloud Computing", NIST Special Publication 800-145, Sep. 2011, Gaithersburg, MD, 7 pgs.

* cited by examiner t = target
c = context

TOKEN EMBEDDING BASED ON TARGET-CONTEXT PAIRS

BACKGROUND

Program code, such as source or other computer code, is an example of unstructured data of which large corpuses exist in both public repository stores and private repository stores like those found at many enterprises. Leveraging these corpuses for valuable insights and use cases can advantageously change the way engineers develop software.

A fruitful method to achieve this goal is embedding unstructured data sources in vector space and then using the resulting vector representations to develop use cases. Creating embeddings of unstructured data, such as representations of tokens/words of program code as vectors, can be a powerful technique used in machine learning and, in particular, in natural language processing with great effect.

Token embedding models such as the 'Word2Vec' technique can map the underlying dataset into a structured context format such as skip-gram or continuous bag of words (CBOW). However, while these techniques may work relatively well with sequential data such as natural language phrases and paragraphs, they tend not to translate well to tree or graph based data sources because these data sources are not a path of tokens that symbolize language, and proximity in the unstructured data, such as in program code text, does not necessarily indicate context. As a result, the value that might be extracted from a large proportion of possible data sources is not realized.

SUMMARY

Shortcomings of the prior art are overcome and additional advantages are provided through the provision of a computer-implemented method. The method obtains a structural representation of data. The structural representation includes nodes and indicates relationships between the nodes. The method obtains a context template that identifies relationship(s) to use in identifying a respective context for different nodes of the structural representation. The method applies the context template to the structural representation to obtain a set of target-context pair. Each target-context pair of the set of target-context pairs includes a respective target node of the structural representation and a respective set of context node(s), of the structural representation, for that target node, as identified based on the context template. The method then uses the target-context pairs in a model and obtains, as output of the model, representations of target nodes of the target-context pairs as vectors in a vector space.

The foregoing method has an advantage in that it provides an approach for building target-context pairings and embedding tokens of unstructured data in vector representations.

Further, a computer program product including a computer readable storage medium readable by a processing circuit and storing instructions for execution by the processing circuit is provided for performing a method. The method obtains a structural representation of data. The structural representation includes nodes and indicates relationships between the nodes. The method obtains a context template that identifies relationship(s) to use in identifying a respective context for different nodes of the structural representation. The method applies the context template to the structural representation to obtain a set of target-context pair. Each target-context pair of the set of target-context pairs includes respective target node of the structural representation and a respective set of context node(s), of the structural representation, for that target node, as identified based on the context template. The method then uses the target-context pairs in a model and obtains, as output of the model, representations of target nodes of the target-context pairs as vectors in a vector space.

Yet further, a computer system is provided that includes a memory and a processor in communication with the memory, wherein the computer system is configured to perform a method. The method obtains a structural representation of data. The structural representation includes nodes and indicates relationships between the nodes. The method obtains a context template that identifies relationship(s) to use in identifying a respective context for different nodes of the structural representation. The method applies the context template to the structural representation to obtain a set of target-context pair. Each target-context pair of the set of target-context pairs includes a respective target node of the structural representation and a respective set of context node(s), of the structural representation, for that target node, as identified based on the context template. The method then uses the target-context pairs in a model and obtains, as output of the model, representations of target nodes of the target-context pairs as vectors in a vector space.

Additional features and advantages are realized through the concepts described herein.

In some examples, the model includes a word embedding model. This provides an advantage in that, working via the created target-context pairs, it enables application of the word embedding model to unstructured data. The word embedding model can include a neural network, and the method can further include training the neural network using the target-context pairs. This has an advantage in that it enables training a word embedding model, which traditionally intakes sequential data such as natural language data, using unstructured data that does not provide such a context like that of sequential data.

The data can include program code and the structural representation can include a syntax tree representation of a syntactic structure of the program code and/or a graph representation of the program code. This has an advantage in that it can work with different structural representations of program code. Each target node of a structural representation can represent a word of the program code, and each vector of the obtained vectors can represent a respective word of the program code. This has an advantage in that it embeds tokenized program level at the token level, providing a numerical vector value for context of individual words in the program code.

In some examples, each of the relationship(s) identified by the context template can be selected from the group consisting of a child, a parent, a sibling, a descendent, and an ancestor relationship. This has an advantage of enabling flexibility in defining what exactly represents a target's context.

The structural representation can include a defined order of nodes of the structural representation, and the applying can apply the context template to the target nodes in the defined order to produce the target-context pairs to have an order corresponding to the defined order. This has an advantage in that it carries into the target-context representations the ordering intended by the representation. Such ordering can be significant when considering context of a token.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
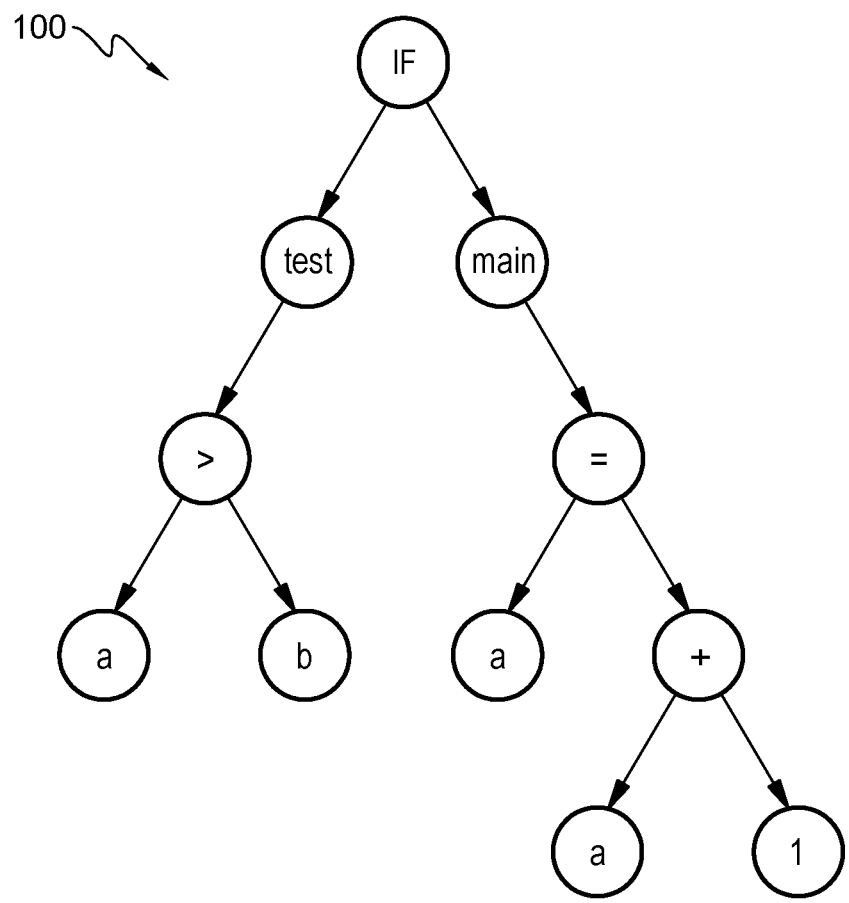
FIG. 1 depicts an example structural representation of program code.

Described herein are approaches for unstructured data embedding, and particularly techniques for embedding tokens (also referred to herein as 'words') in tree or graph representations of program code. As noted, existing techniques for word embedding do not adequately embed various kinds of unstructured data, such as program code. Possible data sources that are a more suitable representation of program code, and from which value could be extracted, are abstract syntax tree (AST) representations of program code and network graphs. Aspects described herein present a solution in which tree or graph data are mapped to structured data using node context. This structured form can then be used in an any appropriate modeling technique, such as embedding techniques popularly used in deep learning and natural language processing. One such technique is the Word2vec technique. As described herein, a context mapping approach creates target-context pairs which are fed into, e.g., a traditional natural language processing framework for token embedding.

Current methods to convert words to vector representation, such as the skip-gram or CBOW approaches, work on language data but not tree or graph data. Skip-gram and CBOW are not effective with tree or graph data, at least in part because language is effectively a path and the current techniques are designed to apply to paths rather than the more generic tree or graph representations of data.

Some approaches that train embeddings can be very computationally expensive and difficult to parallelize, and context considerations may be limited only to the children of a node. Additionally, a tree-based convolutional neural network approach to extract structural information of ASTs for classifying programs by functionality, and detecting code snippets, may not be effective because AST nodes often have differing numbers of children, and may require that any subtree be viewed a binary tree, regardless of its size and shape.

Therefore, aspects described herein are provided to address the shortcomings of the prior art. Aspects create target-context pairs/pairings from structural representations of data, such as an AST representation of program code, to capture the context of tree nodes, i.e. the individual tokens of the code. These pairs are then used in a natural language processing model, such as a Word2Vec model, to create embeddings of the AST nodes, therefore embeddings of the program code tokens. Different contexts of the target-context may be well aligned in the embedding space to preserve the relatedness and structure, with good interpretability of the AST node embedding.

In some embodiments, a context template is defined and applied at each node of the syntax tree representation of program code as a 'target'. Applying the template maps that target node to its context, creating a target-context pairing. Placeholder nodes may be defined, for instance when no node satisfies a context location, in which case the context may be filled-in with the placeholder nodes. The target-context pairings could be used with any appropriate model, such as a machine learning model, and more particularly, as one example, a deep learning embedding model. Notably, the approaches described herein preserve (do not lose) the position and structure information of the syntax table, and can scale up to a large number of different positions in these syntax tables.

Initially, program code from a subject corpus is to be mapped to a structural representation of the program code. A structural representation commonly used for program code is an abstract syntax tree representation, though others, such as a control flow graphs (CFG), call graph, or dependency graph, are possible. 1. A 'tokenization' process breaks down the code statements into tokens and builds relationships between the tokens. FIG. 1 depicts an example structural representation of program code. Tree 100 includes nodes related to other nodes by way of relationships indicated by arrows connecting the nodes. Each node represents a token/word from the program code. All nodes except the leaf targets (tokens a, b, and 1) have at least one child node. The root node representing the token "if" has two children, 'test' and 'main'. Tree 100 is, in this example, a binary tree (each node has at most two children), though ASTs are not always binary trees and aspects described herein apply to non-binary trees as well.

An AST representation of program code can be produced by any of varying known techniques, as appreciated by skilled artisans.

A context template, such as a skip-node tree template, is defined for selecting which child, parent, sibling, descendent and/or ancestor node(s) are to be used to define the context of a target node. The context template identifies one or more relationships to use in identifying a respective context for the target node(s) of the tree.

Figure 2:
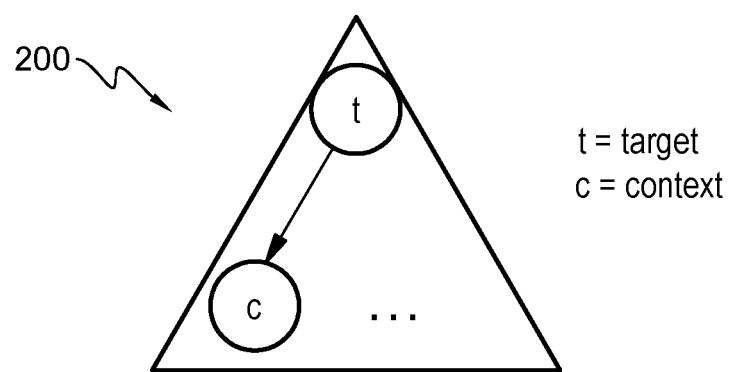
FIG. 2 depicts an example context template identifying relationship(s) to use in identifying a context for a target, in accordance with aspects described herein.

For example, a relatively basic, though perhaps effective, skip-node tree template may identify only the children of a node. FIG. 2 depicts an example context template 200 identifying relationships to use in identifying a context for a target, in accordance with aspects described herein. In particular, FIG. 2 depicts the context template that identifies the children of a node as representing its context. The context template 200 indicates that, for target node t (i.e. token t), the context c includes each of t's children nodes, i.e. each child token of that target token.

More complex context templates are possible, for instance a template identifying the second ancestor, third descendant, and all siblings, as being the context of a target node, as an example. Selection of the particular context template can be tailored or adjusted by any desired technique. In some examples, the template is determined/refined over time based on determinations of how well each iteration of the template works. The template will dictate the target-context pairs as described herein, which are applied to an embedding model to obtain vectors that developers may work with. Thus, how well a context template 'works' may be determined based on working with the vectors produced based on that template and assessing quality of the vectors. Any of various approaches may be used in this regard, for instance performing code similarity analysis, code duplication detection, bug detection, and bug prediction, as examples. In short, there are evaluation metrics that may readily be used to assess which context templates work well.

A size of the target node context to consider to map to a linear feature representation may also be defined. Size of the target node context can refer to, e.g., a maximum number of tokens that is considered to inform the context of the target. The size could be one, for instance.

Figure 3:
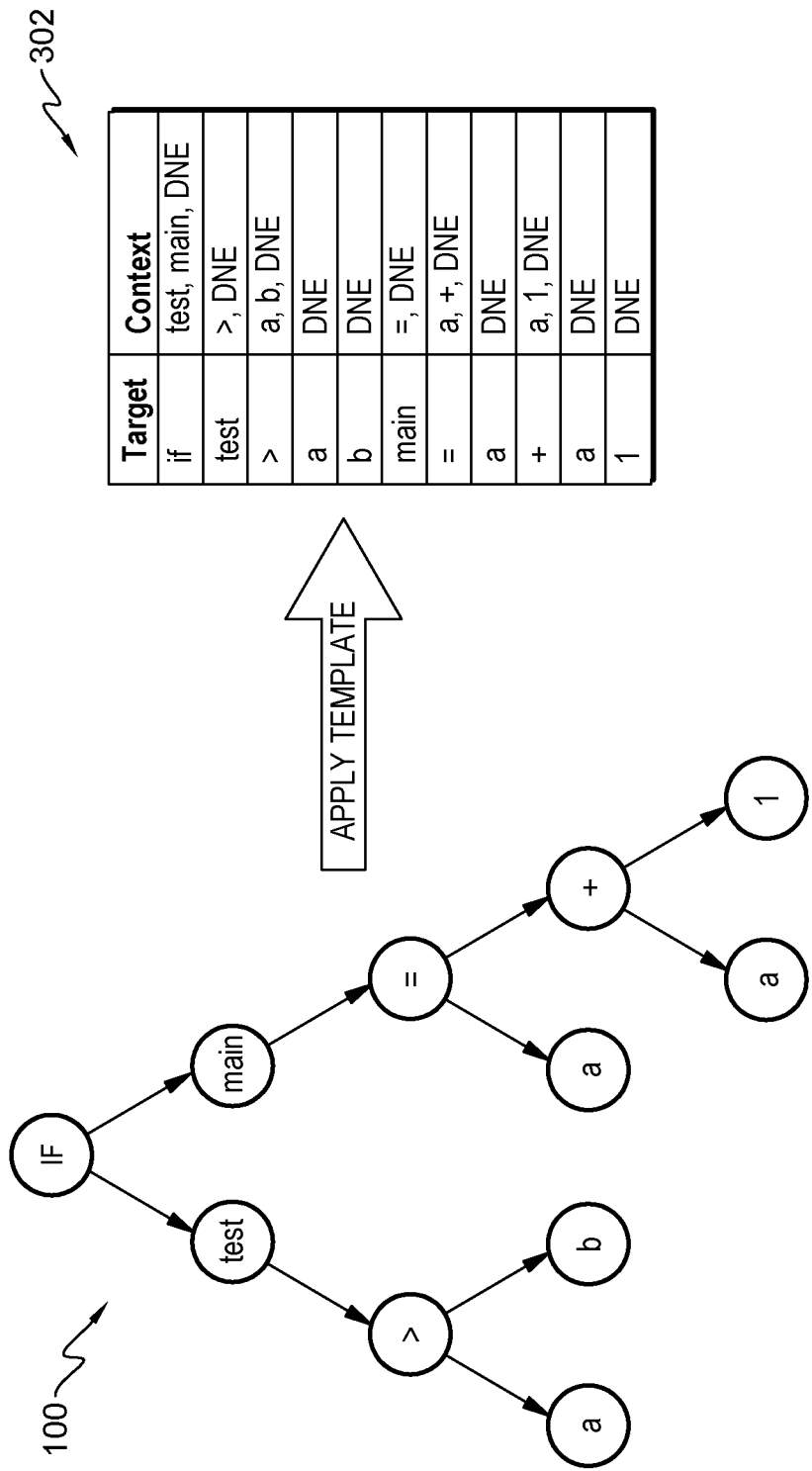
FIG. 3 depicts example target-context pairs from applying the context template of FIG. 2 to the structural representation of FIG. 1, in accordance with aspects described herein.
Figure 4:
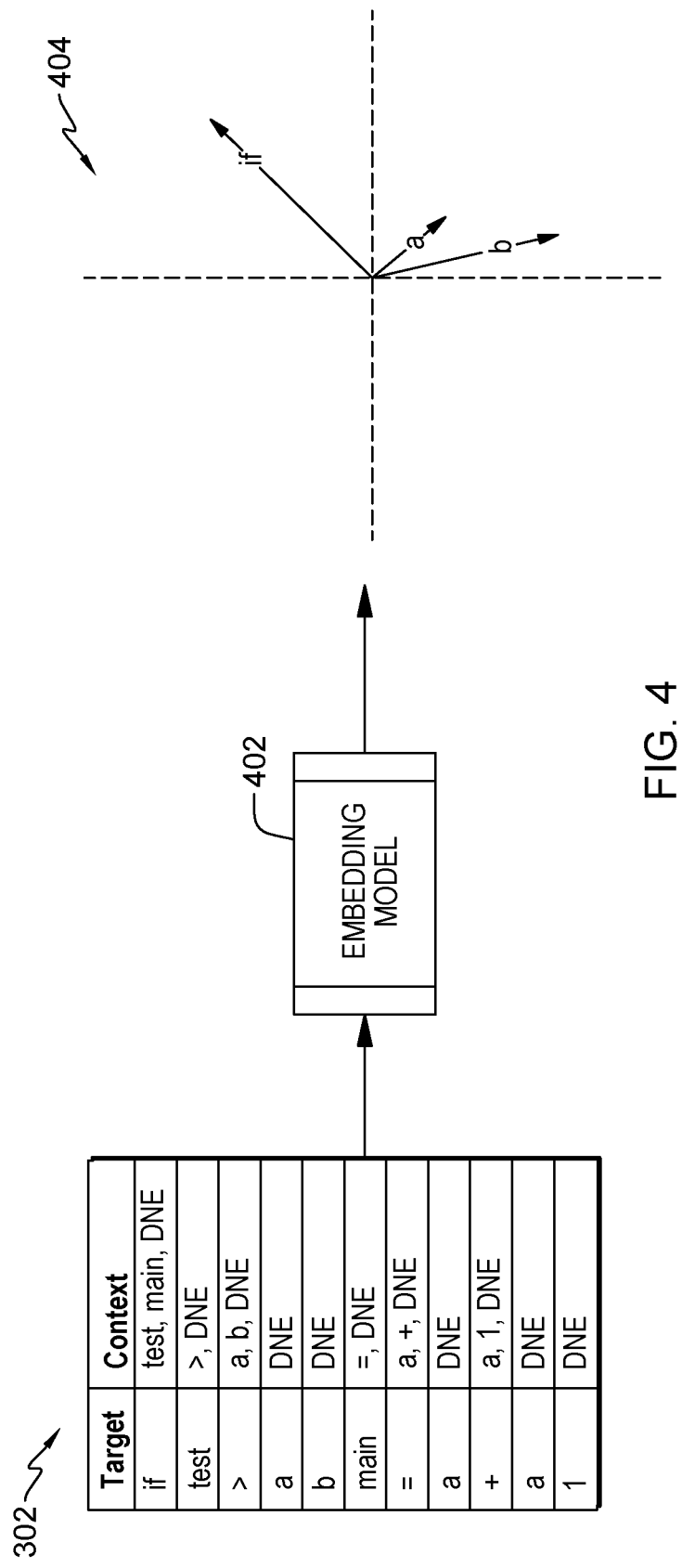
FIG. 4 depicts an example of target embedding in vector space, in accordance with aspects described herein.

In examples described herein, one context template is used in creating the target-context pairs though in other examples multiple templates are used. Thus, in some examples, the size of a target node context may be adjusted by the number of different context templates to be applied to inform the target context. For instance, two templates (or any other number) may be used for each target to inform that target's context. In cases where multiple templates are used, the member tokens of the target's context can be determined from these templates by any desired approach. In one example, target context is the concatenation of all context tokens identified by each template. Alternatively, target context includes only the tokens common to each, or a threshold number of, individual contexts informed by the context templates used. In the example of FIGS. 3 and 4 described below, the size of the target node context is two and a single context template is used.

In some examples, a placeholder token is defined for non-existent context nodes. The placeholder is denoted "DNE" (for 'does not exist') in examples described herein. A non-existent context node may be a context node that does not exist when viewed from a target node. For example, a parent node is non-existent from the root node of a tree. The placeholder may not count toward the size of the target node context in some examples, though it could in others. The placeholder may serve as a flag to identify the end of a context, for instance, which might be expected by the model to process the target-context pairs as described herein. In the example of FIGS. 3 and 4, described below, a DNE placeholder is defined for each target.

Since the abstract syntax tree may have a defined order of the constituent nodes, this order may be maintained during the application of the context template(s) to produce the target-context pairs with a resulting appropriate order (as explained further below with reference to FIG. 3).

With the context template, the nodes of the tree are mapped to linear vector representations that are within the defined context template from above and are within the size of the defined node context from above. For example, if the context template defines all children of a node to be the context, and the size of the node context is set to two, then target-context pairs are created that pair a target node to its context nodes, i.e. zero, one or two children of the target node.

The context template is applied to the syntax tree to obtain a set of target-context pairs, where each such target-context pair includes (i) the target and (ii) a set of one or more context nodes (one of which may be a placeholder token) for that target node, as identified based on the context template. FIG. 3 depicts an example of this applying, showing the example target-context pairs from applying the context template of FIG. 2 to the structural representation of FIG. 1, in accordance with aspects described herein.

In FIG. 3, tree 100 is shown. After applying the template 200 from FIG. 2 (defining context for a target node to be its child nodes), a resulting set of target-context pairs is obtained (presented as table 302). There are eleven such pairs in the table—one for each target node (representing a word/token) of the tree. Each target-context pair includes a target token under the Target column and the context token(s) under the Context column in the same row as the target token.

Applying the template to the root node as the target, the context words of the target 'if' include the words of the root node's children, i.e. 'test' and 'main'. Including the placeholder token in the target context, then the target context for the token/target 'if' is the set {test, main, DNE} as indicated in table 302. It is also noted that the tree 100 is ordered and therefore traversal of the tree in applying the context template follows that order. Here, tree traversal follows a common depth-first search (DFS) traversal order, i.e. the 'pre-order' (NLR) type of depth-first search. Accordingly, the template is applied in that order to build the table row by row according to that order, and therefore table 302 lists the target-context pairs in the order in which the targets are encountered when following that tree traversal order.

The target-context pairs 302 can then be used in a model to obtain, as output, a vector representation, i.e. representations of the target nodes of the target-context pairs as vectors in a vector space. The target-context pairs are, for instance, fed into a natural language processing technique, such as Word2vec, which converts the words to numerical vectors. Thus, the model can be or include a word embedding model, for instance, which might include a neural network. In some examples, the vectors are used to train the neural network. In the case of a Word2Vec model, the commonly used n-gram or continuous bag of words (CBOW) model may be replaced with the built target-context pairings.

Accordingly, a result is that the targets are embedded in vector space in accordance with aspects described herein, an example of which is depicted in FIG. 4. The target-context pairs 302 are fed into an embedding model 402, such as a Word2vec model. The model outputs a vector representation 404 that includes vectors representing the target words. The vectors have numerical components that may be useful to, in the case of embedded program code tokens, software developers. Ordinarily each target would have a corresponding vector in the vector space, however not all vectors for the different target tokens of 302 are shown in FIG. 4; the vector representation 404 depicts only three vectors (for the 'if', 'a' and 'b' tokens).

Figure 5:
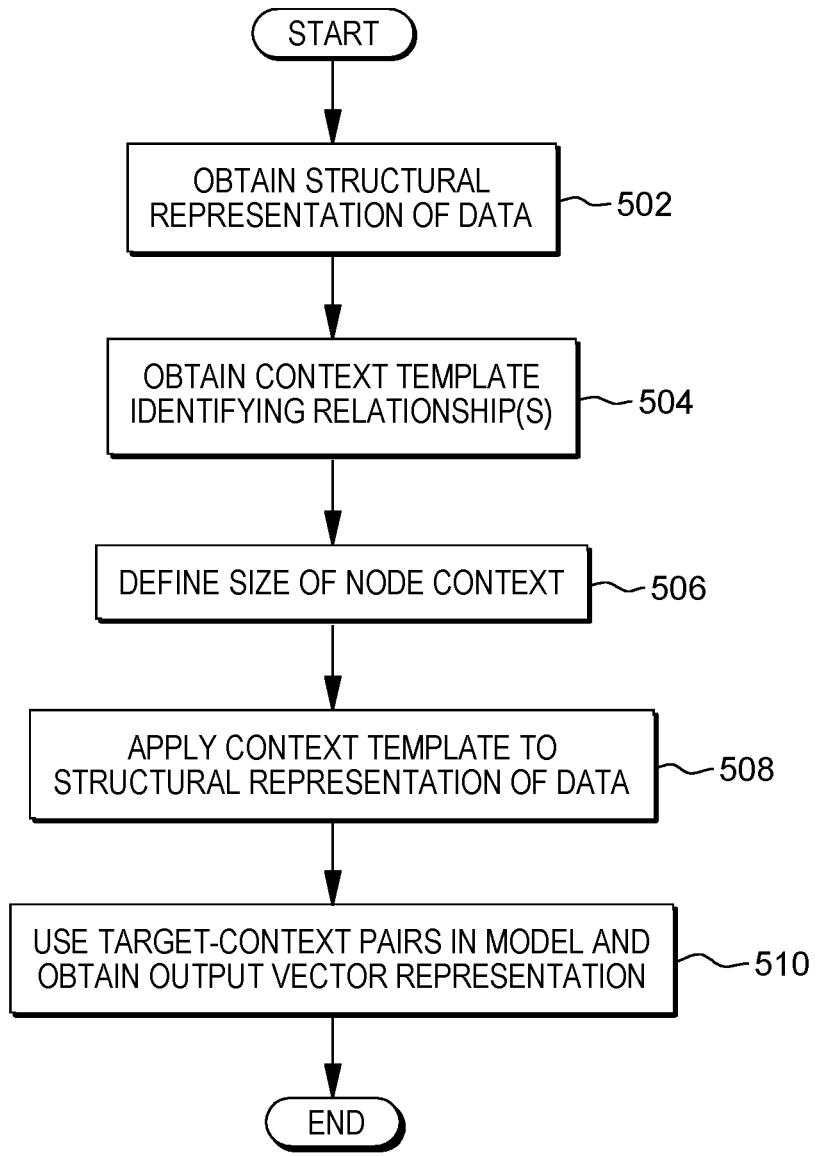
FIG. 5 depicts an example process for token embedding based on target-context pairs, in accordance with aspects described herein.

FIG. 5 depicts an example process for token embedding based on target-context pairs, in accordance with aspects described herein. The process is performed by one or more computer systems, such as those described herein, which may include one or more personal computer systems. In some examples, the processing is performed by graphics processing unit(s) of one or more computer systems. Additionally or alternatively, the processing is performed by a collection of distributed computer system using a distributed computing approach.

The process begins by obtaining (502) a structural representation of data. The structural representation can include nodes and indicate relationships between the nodes. In particular examples, the data is/includes unstructured data, such as program code. An example such structural representation is a syntax tree, for example an abstract syntax tree representation of a syntactic structure of the program code.

As another example, the structural representation is a graph representation of the program code. This has an advantage in that it can work with different structural representations of program code. Each target node in a structural representation can represent a word of the program code. This has an advantage in that it embeds tokenized program level at the token level, providing a numerical vector value for context of individual words in the program code.

In a variation of the process of FIG. 5, the process begins by building the structural representation, for instance building the syntax tree or graph from the program code.

The process continues by obtaining (504) a context template that identifies one or more relationships to use in identifying a respective context for different nodes of the structural representation. Example such relationships identified by the context template can be or include child, parent, sibling, descendent and/or an ancestor relationship(s). This has an advantage in that it enables flexibility in defining what exactly represents the context of a target.

The process also defines (506) a size of the node context, referring to a size which a context for a given target can be. An example size is two, though the size could be any number or an unlimited size.

The process applies (508) the context template to the structural representation and obtains a set of target-context pairs. Each target-context pair of the set of target-context pairs includes and indicates a respective target node of the structural representation and a respective set of one or more context nodes, of the structural representation, for that target node, as identified based on the context template. 'Node' is used in this sense to be the token represented by the node. Since each node represents a token or word, this is to say that each target-context pair indicates (i) a target (token) from the data represented in the structural representation and (ii) one or more context token(s) from the data represented in the structural representation. Thus, for each of several targets of the structural representation, a target-context pair is created that pairs each target token to its respective context tokens. In applying the template (or templates in cases where there is more than one), the size of the node context could operate to limit a number of the context nodes identified for each target node.

The structural representation can include a defined order of the nodes of the structural representation. Applying the context template can apply that context template to the target nodes in the defined order, to produce the target-context pairs to have an order corresponding to the defined order. This is illustrated in the example table 302, in which the target-context pairs are listed by target token in the order by which the tree is ordered, and for each target-context pair, the context tokens are listed in the order in which they appear in the tree. This has an advantage in that it carries into the target-context representations the ordering intended by the representation. Such ordering can be significant when considering context of a token.

The process then uses (510) the target-context pairs in a model, such as a word embedding model like Word2vec. The target-context pairings provide the target and contexts that the model expects in order to properly operate. Consequently, obtained, as output of the model, are representations of the target nodes (i.e. the tokens of those nodes) of the target-context pairs as vectors in a vector space. This produces an output vector representation and each vector of the vector representation can represent a token of the data, for instance a word of the program code. This provides an advantage in that, working via the created target-context pairs, it enables application of the word embedding model to unstructured data.

Example word embedding models, such as Word2vec, include neural network(s). In particular examples, the target-context pairs are used to training such a neural network. This has an advantage in that it enables training a word embedding model, which traditionally intakes sequential data such as natural language data, using unstructured data that does not provide such a context like that of sequential data.

The process of FIG. 5 has an advantage in that it provides an approach for building target-context pairings and embedding tokens of unstructured data in vector representations.

Although various examples are provided, variations are possible without departing from a spirit of the claimed aspects.

Figure 6:
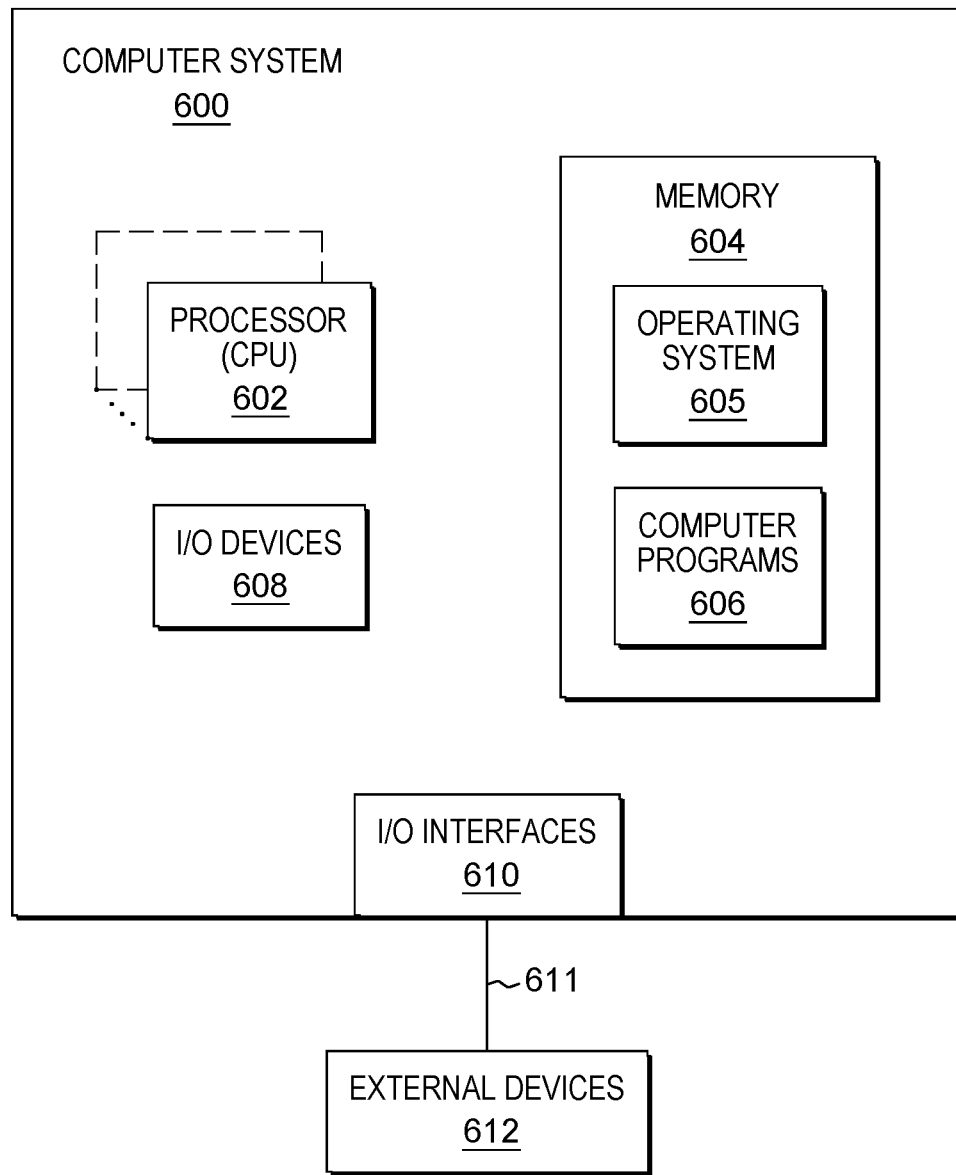
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
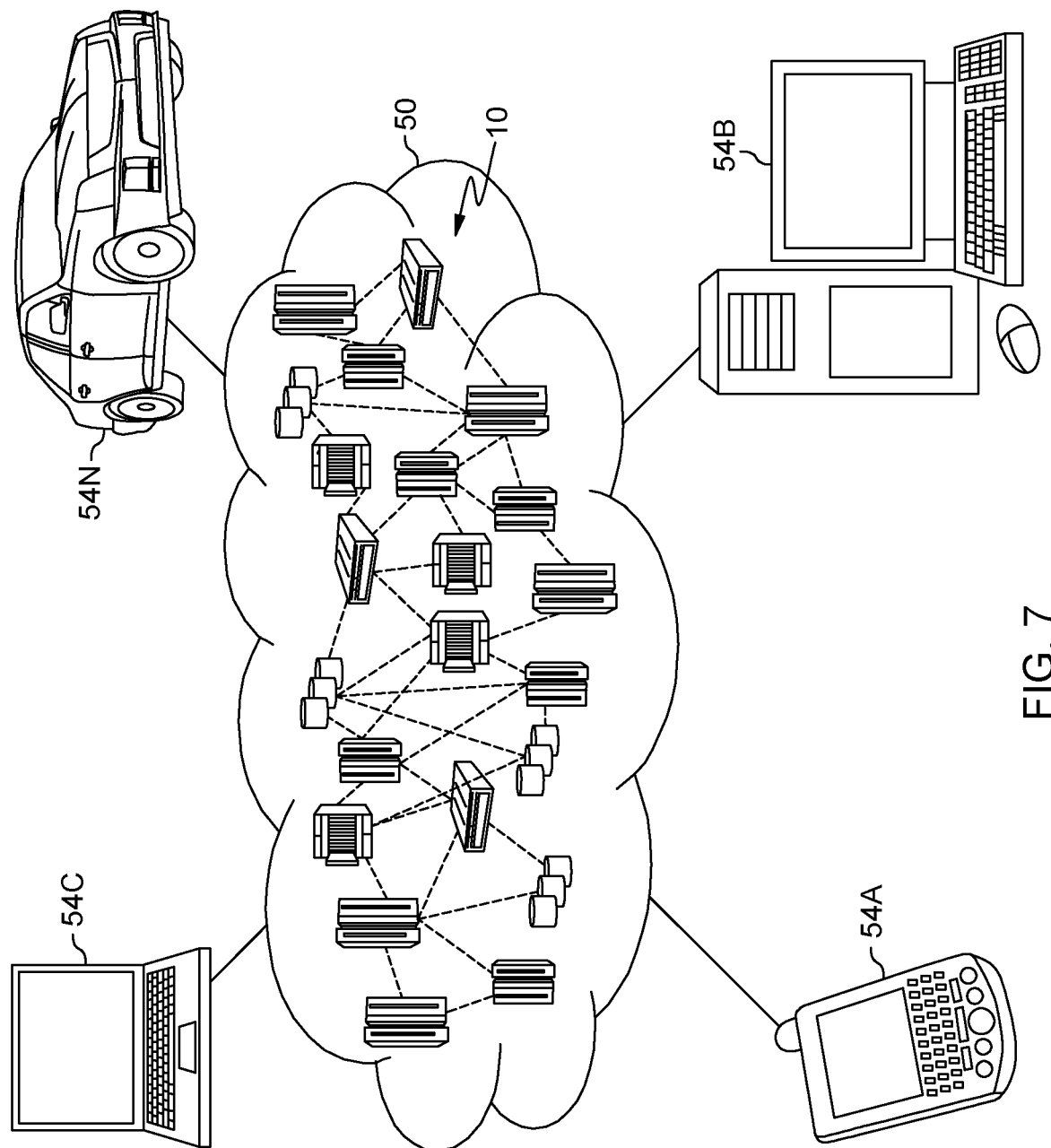
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
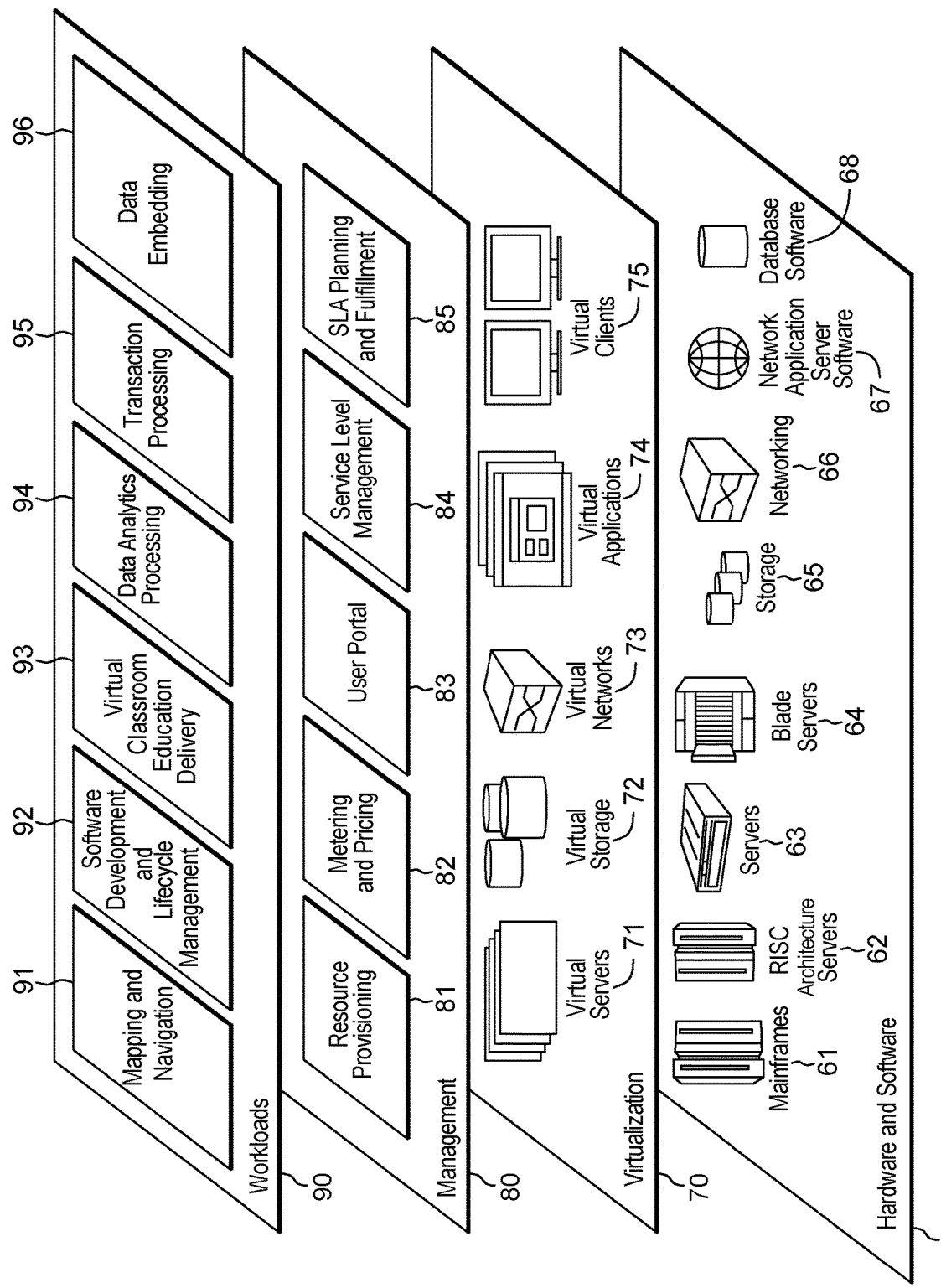
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data embedding 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects (such as the above-described data embedding) may be provided, offered, deployed, managed, serviced, etc. by a service provider who offers and/or manages customer environments. For instance, the service provider can create, offer, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a structural representation of data, the structural representation comprising nodes and indicating relationships between the nodes;
   obtaining a context template that identifies one or more relationships to use in identifying a respective context for different nodes of the structural representation;
   automatically applying the context template to the structural representation to identify a respective context for each node of the different nodes and to obtain a set of target-context pairs, each target-context pair of the set of target-context pairs comprising a respective target node of the different nodes of the structural representation and a respective set of one or more context nodes, of the structural representation, for that target node, as identified based on the automatically applying the context template; and
   using the target-context pairs in a model and obtaining, as output of the model, representations of target nodes of the target-context pairs as vectors in a vector space.

2. The method of claim 1, wherein the model comprises a word embedding model.

3. The method of claim 2, wherein the word embedding model comprises a neural network.

4. The method of claim 3, further comprising training the neural network using the target-context pairs.

5. The method of claim 1, wherein the data comprises program code and the structural representation comprises a syntax tree representation of a syntactic structure of the program code.

6. The method of claim 5, wherein each target node of the different nodes represents a word of the program code, and wherein each vector of the vectors represents a respective word of the program code.

7. The method of claim 1, wherein the data comprises program code and the structural representation comprises a graph representation of the program code.

8. The method of claim 1, wherein each of the one or more relationships identified by the context template are selected from the group consisting of a child, a parent, a sibling, a descendent, and an ancestor relationship.

9. The method of claim 1, wherein applying the context template limits a number of the one or more context nodes identified for each target node of the target nodes.

10. The method of claim 1, wherein the structural representation comprises a defined order of nodes of the structural representation, and wherein the applying applies the context template to the different nodes in the defined order to produce the target-context pairs to have an order corresponding to the defined order.

11. A computer program product comprising:
    a computer readable storage medium readable by a processing circuit and storing instructions for execution by the processing circuit for performing a method comprising:
      obtaining a structural representation of data, the structural representation comprising nodes and indicating relationships between the nodes;
      obtaining a context template that identifies one or more relationships to use in identifying a respective context for different nodes of the structural representation;
      automatically applying the context template to the structural representation to identify a respective context for each node of the different nodes and to obtain a set of target-context pairs, each target-context pair of the set of target-context pairs comprising a respective target node of the different nodes of the structural representation and a respective set of one or more context nodes, of the structural representation, for that target node, as identified based on the automatically applying the context template; and
      using the target-context pairs in a model and obtaining, as output of the model, representations of target nodes of the target-context pairs as vectors in a vector space.

12. The computer program product of claim 11, wherein the model comprises a word embedding model.

13. The computer program product of claim 12, wherein the word embedding model comprises a neural network, and wherein the method further comprises training the neural network using the target-context pairs.

14. The computer program product of claim 11, wherein the data comprises program code and the structural representation comprises one selected from the group consisting of: a syntax tree representation of a syntactic structure of the program code, and a graph representation of the program code.

15. The computer program product of claim 11, wherein the structural representation comprises a defined order of nodes of the structural representation, and wherein the applying applies the context template to the different nodes in the defined order to produce the target-context pairs to have an order corresponding to the defined order.

16. A computer system comprising:
    a memory; and
    a processor in communication with the memory, wherein the computer system is configured to perform a method comprising:

obtaining a structural representation of data, the structural representation comprising nodes and indicating relationships between the nodes;

obtaining a context template that identifies one or more relationships to use in identifying a respective context for different nodes of the structural representation;

automatically applying the context template to the structural representation to identify a respective context for each node of the different nodes and to obtain a set of target-context pairs, each target-context pair of the set of target-context pairs comprising a respective target node of the different nodes of the structural representation and a respective set of one or more context nodes, of the structural representation, for that target node, as identified based on the automatically applying the context template; and using the target-context pairs in a model and obtaining, as output of the model, representations of target nodes of the target-context pairs as vectors in a vector space.

17. The computer system of claim 16, wherein the model comprises a word embedding model.

18. The computer system of claim 17, wherein the word embedding model comprises a neural network, and wherein the method further comprises training the neural network using the target-context pairs.

19. The computer system of claim 16, wherein the data comprises program code and the structural representation comprises one selected from the group consisting of: a syntax tree representation of a syntactic structure of the program code, and a graph representation of the program code.

20. The computer system of claim 16, wherein the structural representation comprises a defined order of nodes of the structural representation, and wherein the applying applies the context template to the different nodes in the defined order to produce the target-context pairs to have an order corresponding to the defined order.

* * * * *